United States Patent
De Lathauwer et al.

(10) Patent No.: US 9,487,075 B2
(45) Date of Patent: Nov. 8, 2016

(54) WORK VEHICLE WITH TRACTION GEARBOX COOLING

(71) Applicant: CNH Industrial America LLC, New Holland, PA (US)

(72) Inventors: Tom A. De Lathauwer, Lede (BE); Lode A. Demonie, Staden (BE); Guy H. J. Osselaere, Loppem (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/636,957

(22) Filed: Mar. 3, 2015

(65) Prior Publication Data

US 2015/0247564 A1    Sep. 3, 2015

(30) Foreign Application Priority Data

Mar. 3, 2014    (BE) .................................. 2014/0143

(51) Int. Cl.
*B60K 11/02*    (2006.01)
*A01F 12/56*    (2006.01)
*F01P 11/08*    (2006.01)
(Continued)

(52) U.S. Cl.
CPC .............. *B60K 11/02* (2013.01); *A01F 12/56* (2013.01); *F01P 11/08* (2013.01); *F16H 61/4165* (2013.01); *B60K 11/04* (2013.01); *B60K 17/04* (2013.01); *B60K 17/043* (2013.01); *B60K 17/105* (2013.01); *B60Y 2200/222* (2013.01); *F01P 2060/045* (2013.01)

(58) Field of Classification Search
CPC .... A63F 13/005; A63F 13/22; A63F 13/812; A63F 13/533

USPC .............................. 477/98; 701/101; 180/339
See application file for complete search history.

(56) References Cited

U.S. PATENT DOCUMENTS 6,616,059 B2    9/2003    Sabhapathy et al.
6,758,266 B1 *  7/2004    Sjunnesson ............ B60R 17/02
                                                    123/41.33

(Continued)

FOREIGN PATENT DOCUMENTS

CN    202278970 U    6/2012
DE    3201443 A1     5/1983
GB    2429763 A      3/2007

OTHER PUBLICATIONS

EP 15157332, Search Report, dated Jul. 28, 2015, 2 pages.
(Continued)

*Primary Examiner* — Darlene Condra
(74) *Attorney, Agent, or Firm* — Peter K. Zacharias; Patrick M. Sheldrake

(57) ABSTRACT

A work vehicle equipped with a main engine, a main engine gearbox and a main engine cooling circuit for circulating an engine coolant, the cooling circuit comprising at least one sub-portion comprising a radiator for heating the driver's cabin of the work vehicle. A heat exchanger is configured for heat exchange between said engine coolant and a lubricant flowing in a circuit into and out of a gearbox other than the engine gearbox. This latter gearbox can be the traction gearbox driven by a hydrostatic motor that is in turn powered by main-engine driven pump. The traction gearbox oil is then cooled by the engine coolant when the temperature difference between the engine coolant and the traction gearbox oil is higher than when the work vehicle is in active operation in the field.

13 Claims, 3 Drawing Sheets

(51) Int. Cl.
*F16H 61/4165* (2010.01)
*B60K 11/04* (2006.01)
*B60K 17/04* (2006.01)
*B60K 17/10* (2006.01)

(56) References Cited

U.S. PATENT DOCUMENTS

| | | | |
|---|---|---|---|
| 6,899,074 B1 | 5/2005 | Carlsson | |
| 7,073,467 B2* | 7/2006 | Kanno | F01P 7/165 123/41.33 |
| 7,806,091 B2 | 10/2010 | Esau et al. | |
| 8,205,709 B2* | 6/2012 | Gooden | B60H 1/14 123/41.31 |
| 8,375,917 B1* | 2/2013 | Neal | F01M 5/002 123/196 A |
| 8,485,932 B2 | 7/2013 | Beechie et al. | |
| 8,631,772 B2 | 1/2014 | Gooden et al. | |
| 8,781,694 B1* | 7/2014 | Sheidler | A01D 41/1274 56/11.1 |
| 2005/0016193 A1 | 1/2005 | Tarasinski et al. | |
| 2007/0281815 A1* | 12/2007 | Gollner | F16H 47/02 475/72 |
| 2008/0085802 A1* | 4/2008 | Rauschenbach | A01D 69/03 475/83 |
| 2009/0101372 A1* | 4/2009 | Matsumoto | E02F 3/815 172/251 |
| 2012/0168254 A1 | 7/2012 | Matousek et al. | |
| 2012/0279699 A1 | 11/2012 | Kim | |
| 2013/0026244 A1 | 1/2013 | Chernyavsky et al. | |
| 2013/0036809 A1* | 2/2013 | Cwik | F02N 11/0855 73/115.05 |
| 2013/0116079 A1* | 5/2013 | Wahl | F16H 1/36 475/5 |
| 2013/0152882 A1* | 6/2013 | Potter | F16H 57/0413 123/41.33 |
| 2013/0203333 A1 | 8/2013 | Amura et al. | |
| 2014/0244134 A1* | 8/2014 | Smith | F02D 11/105 701/101 |
| 2014/0262135 A1* | 9/2014 | Sheppard | B60H 1/14 165/42 |
| 2015/0201560 A1* | 7/2015 | Demirdzhi | A01D 69/005 460/116 |

OTHER PUBLICATIONS

EP 15157332, Written Opinion, dated Jul. 28, 2015, 2 pages.
EP 15157332, Response, filed Jan. 18, 2016, 24 pages.

* cited by examiner

WORK VEHICLE WITH TRACTION GEARBOX COOLING

This application claims foreign priority under 35 U.S.C. §119 to Belgian Application BE2014/0143 filed Mar. 3, 2014 titled "Work Vehicle with Traction Gearbox Cooling" and having Tom A. De Lathauwer, Lode A. Demonie, and Guy H. J. Osselaere as the inventors. The full disclosure of BE2014/0143 is hereby incorporated herein by reference.

FIELD OF THE INVENTION

The present invention is related to work vehicles, primarily to work vehicles for use in agriculture such as combine or forage harvesters for gathering and processing crop material from a field. The invention is related to the cooling of particular components of such a work vehicle.

STATE OF THE ART

Due to the increasing weight and power of agricultural work vehicles, in particular of combine harvesters, more stringent cooling requirements for particular components of the vehicle are coming into play. For example, in existing combine harvesters equipped with a hydrostatic motor configured to drive a traction gearbox, the traction gearbox is not part of a cooling circuit. Especially when driving on the road at the higher speeds reachable by present day combines, this situation is no longer tenable.

Adding a cooling circuit to the combine in addition to existing circuits is however not an ideal solution, given that in most combines there are already up to 5 separate circuits installed. A less technically complex solution is thus required.

SUMMARY OF THE INVENTION

The present invention is related to a work vehicle as disclosed in the appended claims. The invention is thus related to a work vehicle, such as a combine harvester or a forage harvester, equipped with a main engine, a main engine gearbox and a main engine cooling circuit for circulating an engine coolant, the cooling circuit comprising at least one sub-portion comprising a radiator for heating the driver's cabin of the work vehicle. According to the invention, a heat exchanger is configured for heat exchange between said engine coolant and a lubricant flowing in a circuit into and out of a gearbox other than the engine gearbox. In a preferred embodiment, this latter gearbox is the traction gearbox driven by a hydrostatic motor that is in turn powered by a pump driven by the main engine. In this way, the traction gearbox oil is cooled by the engine coolant, which is especially advantageous when the work vehicle is driving on the road, when the temperature difference between the engine coolant and the traction gearbox oil is higher than when the work vehicle is in operation in the field.

DETAILED DESCRIPTION OF PREFERRED EMBODIMENTS OF THE INVENTION

Preferred embodiments will now be described with reference to the drawings. The detailed description is not limiting the scope of the invention, which is defined only by the appended claims. The invention is described with regard to a combine harvester provided with a means for cooling the traction gearbox. The invention is however not limited to this type of work vehicle or gearbox type. Examples of other embodiments are given at the end of this description.

Figure 1:
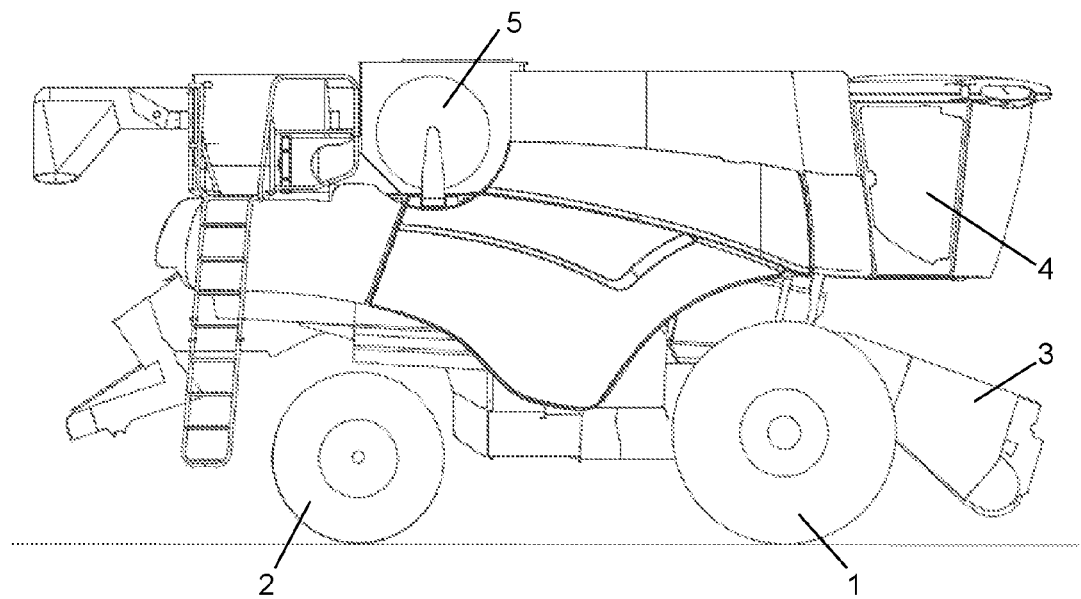
FIG. 1 shows a side view of a combine harvester as known in the art, illustrating the location of a number of components that play a role in the present invention.

FIG. 1 is a side view of a typical combine harvester known today, comprising front and rear wheels 1 and 2, feeder 3, driver's cabin (cab) 4 and main cooling ventilator 5. The main engine is located behind the main ventilator, as well as a stack of heat exchangers that are part of a plurality of cooling circuits: main engine cooling, main engine gearbox cooling, hydraulic oil cooling, etc. The heat exchanger stack is mounted next to the main ventilator, so that the air flow produced by the ventilator cools the cooling fluids flowing through the heat exchangers. The main engine is cooled by an engine coolant, usually a 50/50 glycol/water mixture, pumped around in a cooling circuit including a pump and a radiator, said radiator being one of the heat exchangers in the stack mounted next to the engine. Having acquired thermal energy from the engine, the coolant can be used as a heat source for heating other areas of the combine. In particular, coolant that has reached a given temperature, for example about 85° C., may be diverted to the driver's cabin 4. The latter is provided with a separate radiator, supplied with engine coolant for heating the cabin, and regulated by a thermostat and suitable control means for controlling the flow of coolant towards the cabin, depending on the required heating. This in itself is known in present day combine or forage harvesters.

Figure 2:
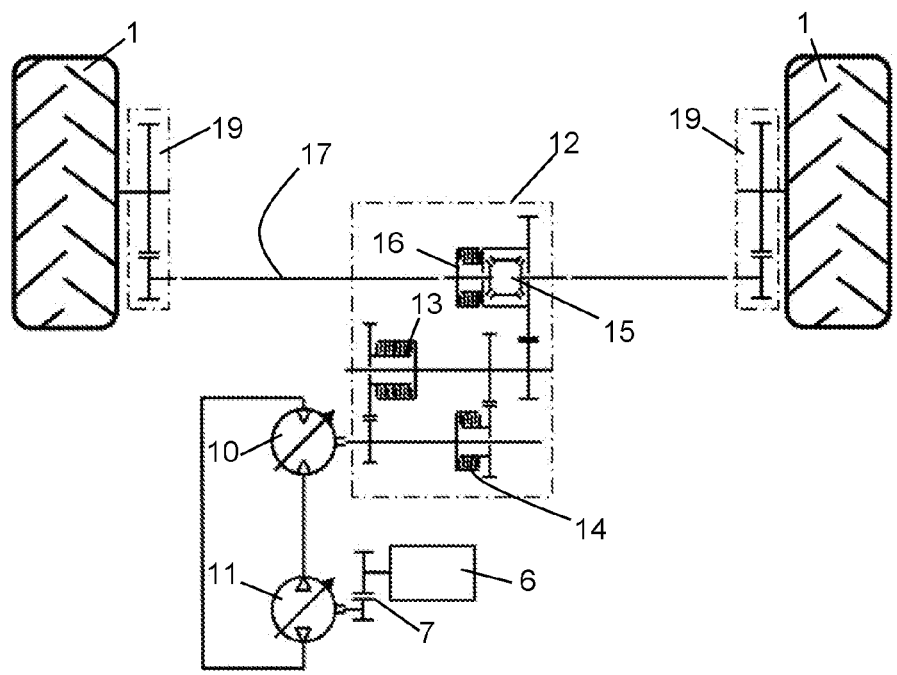
FIG. 2 is a schematic illustration of the interaction between the combine's main engine, hydrostatic motor and traction gearbox.

As stated in the introductory paragraph, the traction of many existing types of combine harvesters is realized through the use of a hydrostatic motor. FIG. 2 illustrates how a hydrostatic motor 10 is coupled to a number of components of the combine. The main engine 6, through the main engine gearbox 7, drives a pump 11, said pump in turn driving the rotation of the hydrostatic motor 10. The motor 10 then drives the main axis of the traction gearbox 12, comprising for example a first gear clutch 13, second gear clutch 14, differential 15 and lock-clutch 16. The front axle 17 of the combine is directly connected to the differential 15 and, possibly through further separate gear transmissions 19, drives the front wheels 1 of the combine.

The traction gearbox 12 in existing combine harvesters is a closed system containing an amount of lubricant, hereafter referred to as oil, for lubricating the various components of the traction gearbox. The temperature of the oil can reach high values of about 120° C., especially when the harvester is moving at high speed on a level road. In a harvester according to the invention, the oil of the traction gearbox is circulated in a cooling circuit comprising a separate heat exchanger wherein heat is exchanged between the traction gear box oil and the engine coolant that is diverted to the driver's cabin from the main engine cooling circuit. For example, when said engine coolant is at a temperature of about 85° C., it is capable of cooling oil at 120° C. down to about 105° C. According to the invention, at least a portion of the engine coolant flowing towards the driver's cabin is directed through the additional heat exchanger. The engine coolant can be directed to the heat exchanger after or before passing through the cabin.

Figure 3:
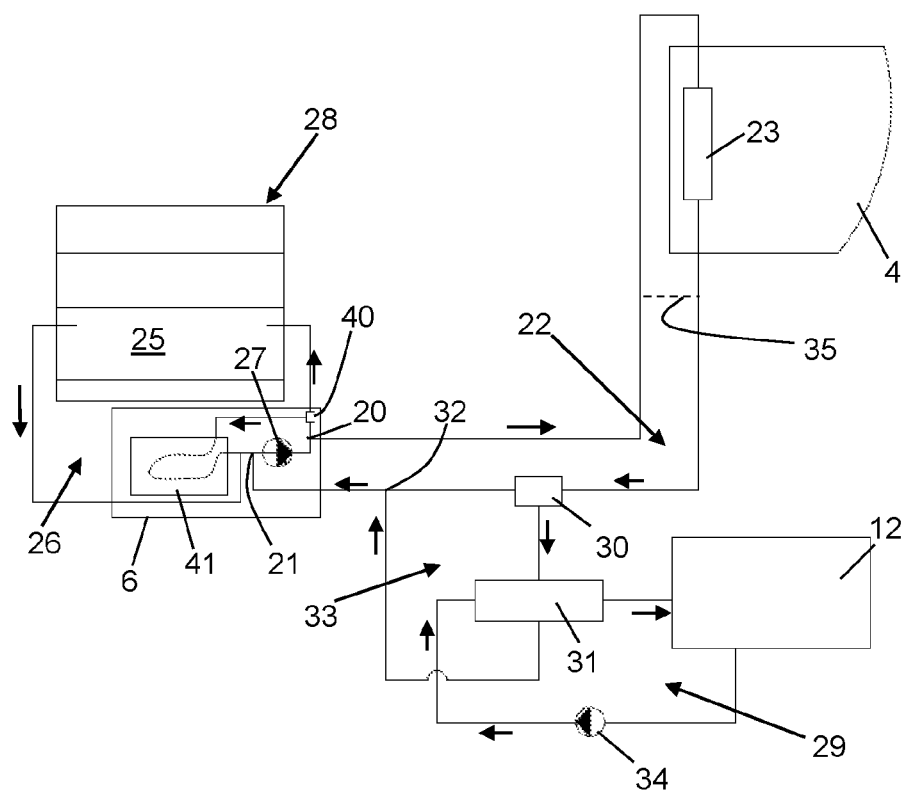
FIG. 3 illustrates the cab heating circuit of a combine harvester according to a first embodiment of the invention.

FIG. 3 illustrates a first embodiment, showing the main components as schematic blocks arranged in flow circuits. The flow of liquids in the circuits is indicated by arrows. The main engine 6, the driver's cabin 4 and the traction gearbox 12 can be recognized. A stack 28 of heat exchangers is visible as well. This is the stack of heat exchangers referred to above, and mounted adjacent the main ventilator 5 shown in FIG. 1. One of these heat exchangers is the engine radiator 25. By the pump 27 that is driven by rotation of the engine shaft, engine coolant is pumped through the main engine cooling circuit 26. A thermostat-operated flow regulator 40 regulates the coolant flow to the engine block 41 depending on the cooling requirements. At junction 20, coolant is extracted from the main cooling circuit and pumped through a sub-portion 22 of the engine cooling circuit that leads to the driver's cabin 4 where heat is removed from the coolant in the cabin radiator 23 (sub-portion 22 is referred to hereafter as the 'cab heating circuit'). The coolant then returns to the engine 6, and re-joins the main engine cooling circuit 26 at junction 21. The temperature of the engine coolant at junction 20 is suitable for heating the cabin (e.g. 85° C.). A flow regulating means may be present (not shown) at junction 20 to regulate the flow of coolant entering the cab heating circuit 22. The components described so far with respect to FIG. 3 and the ways in which they may be implemented are known per se in the art.

In a work vehicle according to the invention, at least a portion of the coolant flowing in the cab heating circuit 22 is fed through an oil/coolant heat exchanger 31, where heat is exchanged between the engine coolant (e.g. at 85° C.) and the oil from the traction gearbox 12 (e.g. at 120° C.), said oil being itself circulated in an oil circuit 29 by pump 34. In the embodiment of FIG. 3, engine coolant flows first through the cab heat exchanger 23 before a part of the engine coolant flow is directed through the oil/coolant heat exchanger 31. The flow through the heat exchanger 31 is regulated by a flow regulator 30, configured to maintain a sufficient flow through the heat exchanger 31 in order to keep the oil in the traction gearbox 12 at a given temperature or within a given temperature range. A suitable control system (not shown) is provided involving a measurement of said temperature, a thermostat and a controller for operating the flow regulator 30 on the basis of said measurement.

Engine coolant exiting from the oil/coolant heat exchanger 31 returns to the cab heating circuit at junction 32. In other words, the engine coolant runs via a branch circuit 33 plumbed into the cab heating circuit 22, said branch circuit 33 comprising the oil/coolant heat exchanger 31. Suitable control means for regulating the temperature in the cab 4 are present but not described here in detail because such control means are well known in work vehicles known in the art. A by-pass connection 35 is preferably present to allow the coolant to return to the main engine circuit without passing through the cabin radiator 23, when no cabin heating is required.

Figure 4:
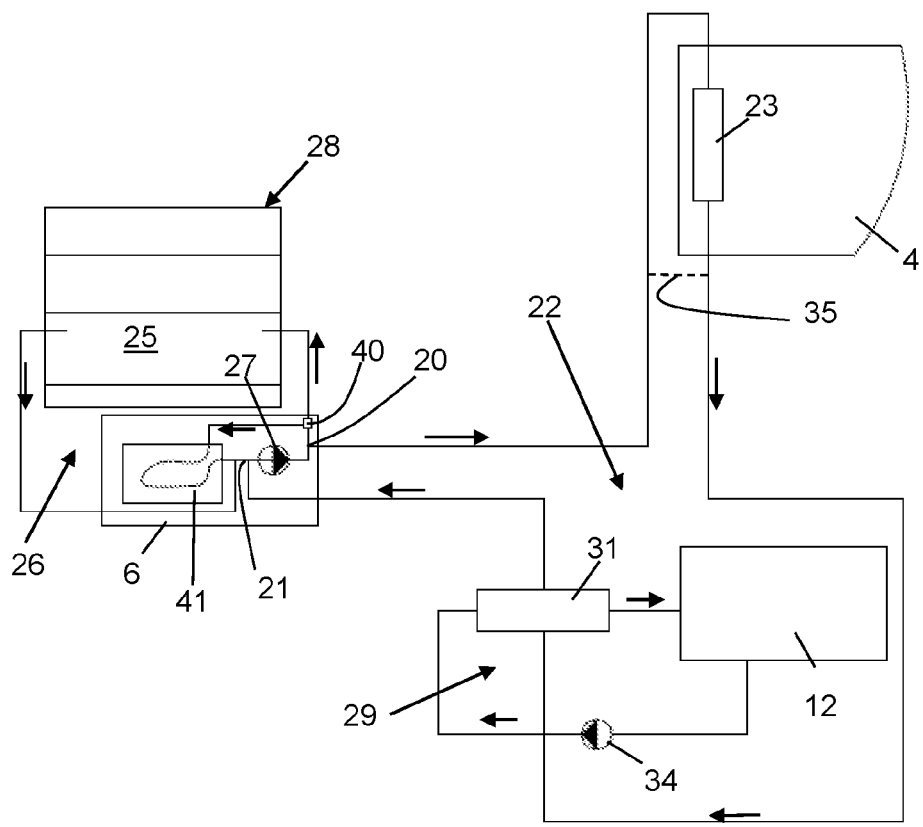
FIG. 4 illustrates the cab heating circuit of a combine harvester according to a second embodiment.

A second embodiment is shown in FIG. 4. The majority of the components shown in FIG. 3 and/or described above are also present here, and indicated by the same reference numerals. According to this embodiment however, the flow of engine coolant exiting the cab radiator 23 is integrally fed into the coolant/oil heat exchanger 31. The oil/coolant heat exchanger 31 is thus a part of the cab heating circuit 22. The control of the temperature of the oil in the traction gearbox 12 cannot take place here by controlling the portion of the flow of the engine coolant through the heat exchanger 31, given that the total flow of said coolant in the cab heating circuit 22 is sent through the heat exchanger 31. This control could be performed in this case by controlling the flow in the cab-heating circuit 22 itself (i.e. controlling the flow entering the cab heating circuit at junction 20).

Figure 5:
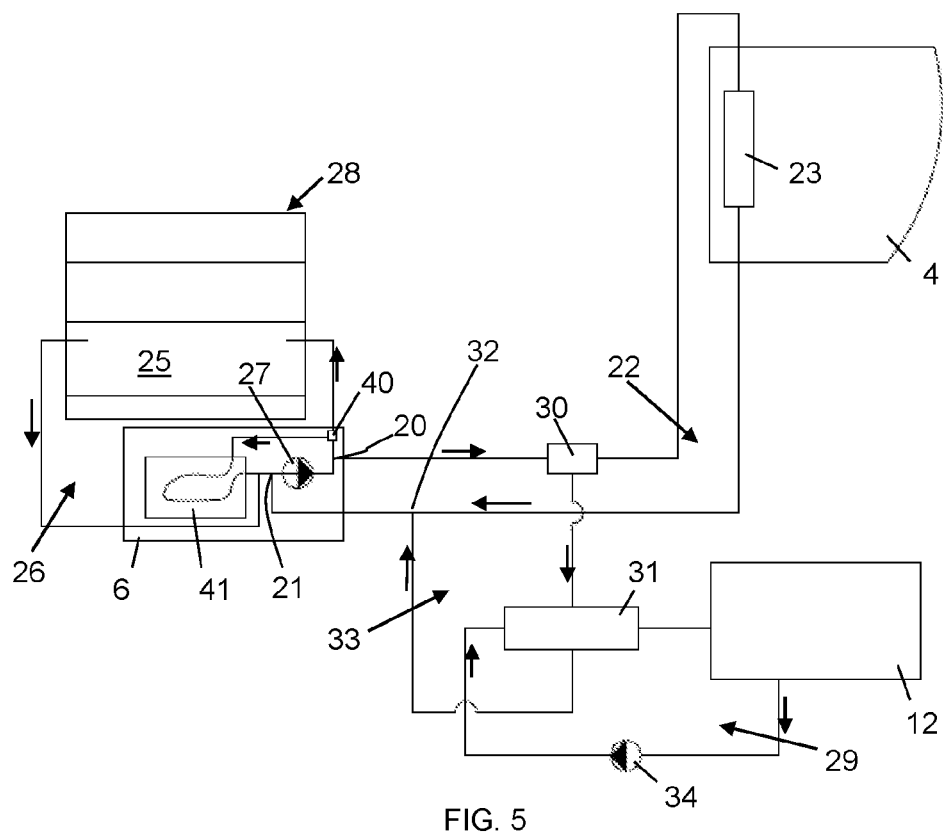
FIG. 5 illustrates the cab heating circuit of a combine harvester according to a third embodiment.

In the embodiment of FIG. 5, the heat exchanger 31 is part of a branch circuit 33 plumbed into the cab heating circuit 22 (as in the embodiment of FIG. 3), but the flow regulator 30 which regulates the flow to said branch circuit 33 is placed upstream of the cab radiator 23, instead of downstream as in the embodiment of FIG. 3. In other words, not the complete engine flow in the cab heating circuit 22 is used for cab heating. This embodiment makes it possible to use engine coolant for cooling the traction gearbox at a well-determined temperature (e.g. 85° C.) as the coolant enters the heat exchanger 31. In the embodiment of FIG. 3, the engine coolant has cooled down in the cab radiator, and the exact temperature of said coolant when it enters the heat exchanger 31 may be more unpredictable. On the other hand, the embodiment of FIG. 3 uses the cab heating to cool the engine coolant before the coolant is applied for cooling the traction gearbox, so that a higher temperature difference between the traction gearbox oil and the engine coolant becomes available.

Figure 6:
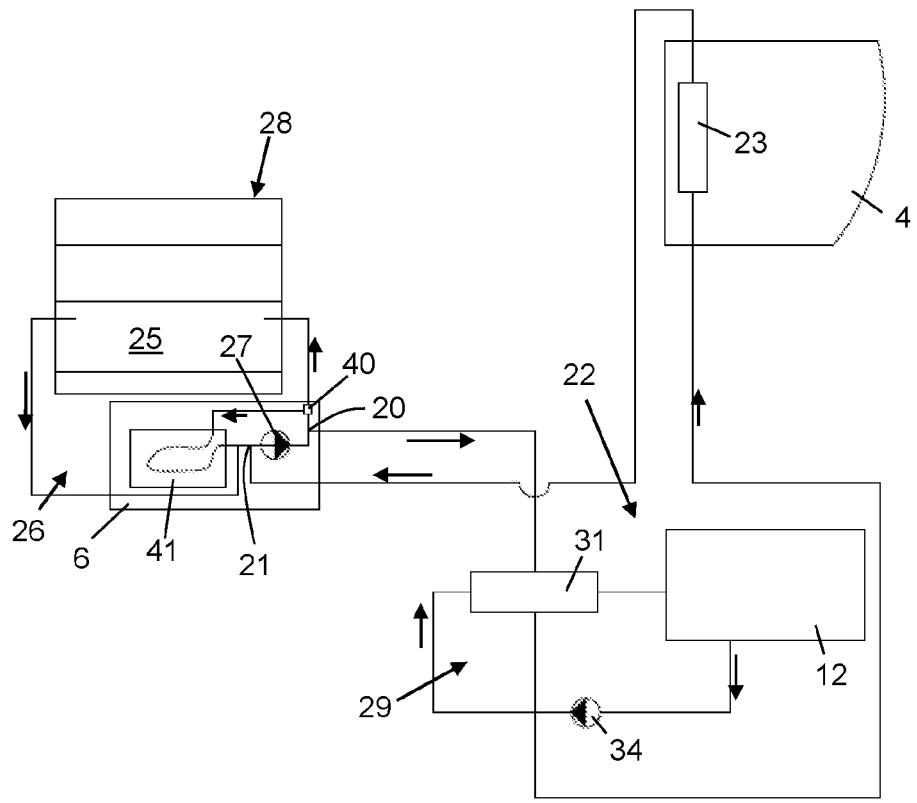
FIG. 6 illustrates the cab heating circuit of a combine harvester according to a fourth embodiment.

In the embodiment of FIG. 6, the heat exchanger 31 is a part of the cab heating circuit 22 (as in the embodiment of FIG. 4), but the engine coolant flows through the heat exchanger 31 before flowing to the cab radiator 23. This embodiment provides the advantage, when working in cold weather, that the heat extracted from the traction gearbox oil is added to the coolant that flows to the cabin radiator 23, thereby increasing the thermal energy available for heating the cabin compared to the embodiment of FIGS. 3 to 5.

The fact that the flow of engine coolant that is used to cool the traction gearbox oil is plumbed into or fully integrated into the cab heating circuit 22 makes it unnecessary to provide an additional cooling circuit running between the heat exchanger stack 28 and the traction gearbox 12. An additional advantage of the invention is that during start-up of the combine, the heat exchange in the heat exchanger 31 is reversed compared to the above-described mode of operation. During start-up, the oil in the traction gearbox 12 is at a lower temperature than the engine coolant. This means that the oil in the traction gearbox is heated up faster towards its operational temperature compared to a combine harvester according to the prior art, which is beneficial in terms of avoiding cold starting problems.

Making use of the temperature difference between the engine coolant and the traction gearbox oil for cooling the latter is especially advantageous given that this difference is the highest when the traction gearbox oil temperature is most likely to become excessive, namely when the combine is driving on the road at high speed. The engine coolant temperature is then not so high due to the lower power consumption of the engine under these circumstances. When operating in the field, the engine coolant reaches higher temperatures and is therefore less effective for cooling the traction gearbox oil, but at this time the latter's temperature is not so high given that the combine's speed is lower also. This makes the inventive approach very effective.

The invention is applicable not only for cooling the traction gearbox in a system as described above, but can also be used to cool other gearboxes in a work vehicle. A combine harvester may for example comprise a gearbox configured to drive the threshing rotors at a given speed. Like the traction gearbox, this rotor gearbox is not actively cooled in presently known harvesters. This gearbox can be cooled in exactly the same way as described above for the traction gearbox, by providing the same components and circuits. In the context of this description, the traction and rotor gearboxes are examples of what is called a 'secondary' gearbox in the appended claims, to distinguish them from the main engine gearbox. The latter is generally cooled, also in presently known work vehicles, via a radiator that is part of the stack 28. The present invention is therefore not applicable to this main engine gearbox but it is specifically aimed at the cooling of the 'secondary' gearboxes referred to above. Often, like the traction gearbox in the embodiment of FIG. 2, these gearboxes are remote from the main engine and the main heat exchanger stack 28, making it complex to provide additional cooling circuits for these components. Possibly several secondary gearboxes in the same harvester could be cooled by providing a heat exchanger 31 and oil circuit 29 for each gearbox. According to another embodiment, one single heat exchanger 31 is used to cool more than one gearbox, each gearbox being provided with a separate lubricant cooling circuit 29 feeding into the heat exchanger 31.

The heat exchanger 31 may be located close to, for example underneath or directly adjacent the driver's cabin, in order to minimise the length of additional tubing required in a work vehicle according to the invention.

The method according to the invention is basically a method for operating a work vehicle as described above, whilst controlling the lubricant temperature, from the moment the work vehicle is started, up to and including an operational regime of the vehicle. During start-up, the lubricant is colder than the engine coolant and is thus heated up in the heat exchanger 31. When the lubricant temperature exceeds the coolant temperature, the lubricant is cooled in the heat exchanger 31 and its temperature is controlled by the heat exchange taking place in said heat exchanger. Preferably, an active control of the lubricant temperature takes place, through a measurement of this temperature in the gearbox, and a control loop that includes controlling the flow of engine coolant through the heat exchanger 31, for example by acting on the flow regulator 30 in the embodiments of FIGS. 3 and 5 or by controlling the flow entering the cab heating circuit 22 at junction 20 in the embodiments of FIGS. 4 and 6, to thereby maintain the lubricant temperature at a given level or within a given range.

The invention claimed is:

1. A work vehicle comprising
    a driver's cabin;
    a main engine and main engine gearbox;
    a secondary gearbox other than the main engine gearbox, said secondary gearbox comprising a lubricant;
    a main engine cooling circuit for circulating an engine coolant, said main engine cooling circuit comprising at least one sub-portion in which the engine coolant flow, the sub-portion comprising a radiator for heating the driver's cabin;
    a cooling circuit in which the lubricant of the secondary gearbox flows; and
    a heat exchanger configured for heat exchange between the engine coolant and the lubricant of the secondary gearbox flowing in the lubricant cooling circuit, the heat exchanger being configured to receive at least a portion of the engine coolant flowing in the sub-portion of the main engine cooling circuit and to transfer heat from the lubricant of the secondary gearbox flowing in the lubricant cooling circuit to the at least portion of the engine coolant flowing in the sub-portion of the main engine cooling circuit.

2. The work vehicle according to claim 1, wherein the heat exchanger is part of a branch circuit plumbed into the sub-portion of the main engine cooling circuit.

3. The work vehicle according to claim 2, wherein the branch circuit is configured to receive a portion of the coolant flowing in the sub-portion of the main engine cooling circuit, after the portion of the coolant has passed through the cabin radiator.

4. The work vehicle according to claim 3, comprising a flow regulator, configured to control the portion of the coolant directed through the branch circuit, to thereby control the temperature of the lubricant in the secondary gearbox.

5. The work vehicle according to claim 2, wherein the branch circuit is configured to receive a portion of the coolant flowing in the sub-portion of the main engine cooling circuit, a remainder of said coolant being directed to the radiator.

6. The work vehicle according to claim 1, wherein the heat exchanger is part of the sub-portion of the main engine cooling circuit.

7. The work vehicle according to claim 6, configured so that the coolant flowing in the sub-portion of the main engine cooling circuit is directed to the cabin radiator before passing through the heat exchanger.

8. The work vehicle according to claim 6, configured so that the coolant flowing in the sub-portion of the main engine cooling circuit is directed to the cabin radiator after having passed through the heat exchanger.

9. The work vehicle according to claim 1, further comprising a hydrostatic motor and a traction gearbox, the hydrostatic motor being configured for driving the traction gearbox, and wherein the secondary gearbox is the traction gearbox.

10. The work vehicle according to claim 1, wherein the work vehicle is a combine harvester or a forage harvester.

11. The work vehicle according to claim 10, wherein the secondary gearbox or a further secondary gearbox is a threshing rotor gearbox.

12. A method for controlling a temperature of the lubricant of the secondary gearbox in the work vehicle according to claim 1, the method comprising the steps of:
    starting the main engine;
    as long as the temperature of the lubricant in the secondary gearbox is lower than a temperature of the engine coolant flowing in the sub-portion of the main engine cooling circuit, heating the lubricant in the heat exchanger, until the lubricant reaches a same temperature as the temperature of the engine coolant flowing in the sub-portion; and
    when the temperature of the lubricant in the secondary gearbox exceeds the temperature of the engine coolant flowing in the sub-portion of the main engine cooling circuit, cooling the lubricant in the heat exchanger.

13. The method according to claim 12, wherein the temperature of the lubricant in the secondary gearbox is maintained at a given level or within a given range by controlling the coolant flowing through at least one of the sub-portion of the main cooling circuit and a branch circuit.

* * * * *